(No Model.)
G. W. ALDRICH.
FAUCET.
No. 374,725. Patented Dec. 13, 1887.
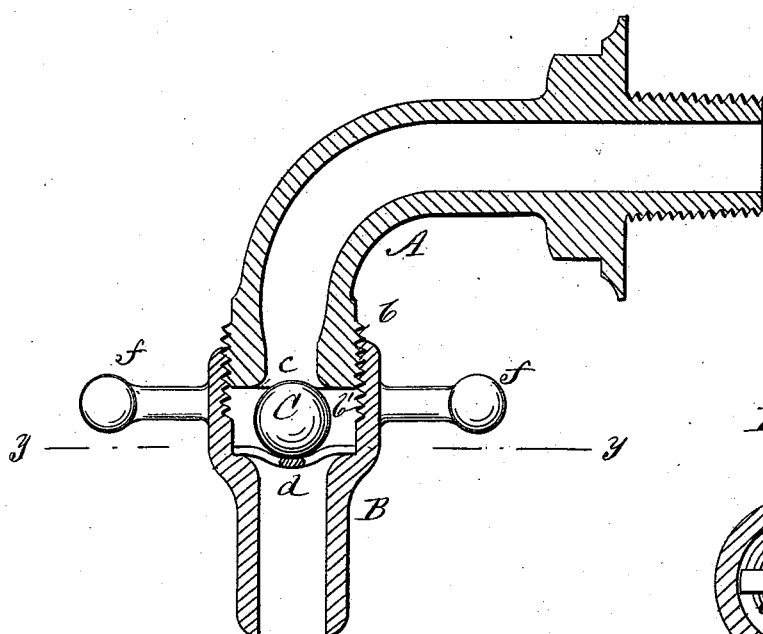
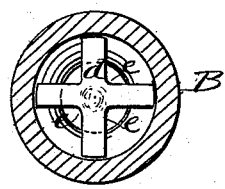
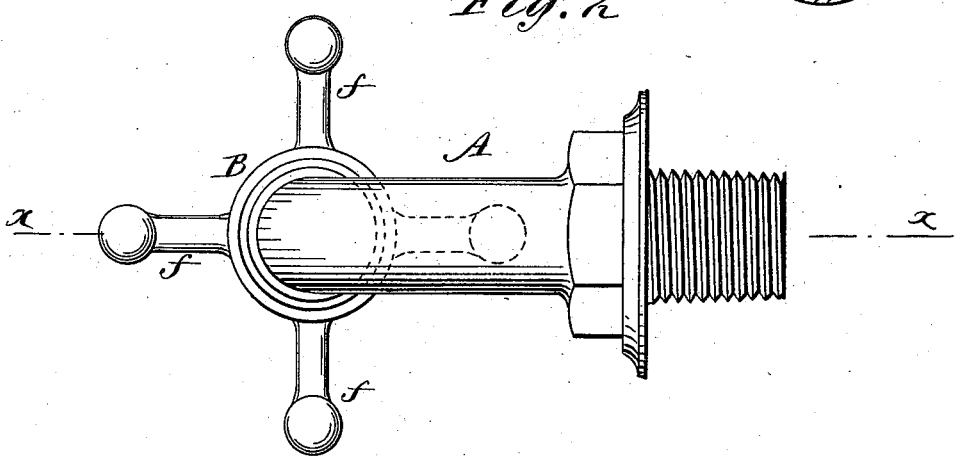
WITNESSES:
C. Neveux
C. Sedgwick
INVENTOR:
G. W. Aldrich
BY Munn & Co
ATTORNEYS.

United States Patent Office.

GEORGE W. ALDRICH, OF BROOKLYN, NEW YORK, ASSIGNOR TO HIMSELF AND WILLIAM GREEN, OF SAME PLACE.

FAUCET.

SPECIFICATION forming part of Letters Patent No. 374,725, dated December 13, 1887.

Application filed June 10, 1887. Serial No. 240,902. (No model.)

*To all whom it may concern:*

Be it known that I, GEORGE W. ALDRICH, of Brooklyn, in the county of Kings and State of New York, have invented a new and useful Improvement in Faucets, of which the following is a full, clear, and exact description.

This invention relates to faucets fitted with a ball-valve, and in which the nozzle or delivery end of the faucet that carries said valve is formed of a separate piece and is adjustable by screw-thread up and down the adjacent receiving portion of the faucet to close or open a valve-seat in said adjacent portion; and the invention consists in a novel construction and combination of parts, including a loose removable and revoluble valve support or seat of spider-like or open-work construction within the adjustable nozzle-section of the faucet, and a soft or flexible and elastic ball-valve of rubber or equivalent material, substantially as herein described, and pointed out in the claim.

Reference is to be had to the accompanying drawings, forming a part of this specification, in which similar letters of reference indicate corresponding parts in all the figures.

Figure 1 represents a longitudinal vertical section, upon the line *x x* in Fig. 2, of a faucet embodying my invention. Fig. 2 is a plan view of the same, and Fig. 3 is a horizontal section upon line *y y* in Fig. 1.

A is the body or inlet portion of the faucet, and B is its nozzle or delivery portion. These two parts form independent sections, and the nozzle or outlet portion B is made longitudinally adjustable upon or over the delivery-end part of the inlet or body portion A, as by an interior screw-thread, *b'*, in an enlarged upper portion of the nozzle or outlet part B, made to fit an exterior screw-thread, *b*, upon the delivery-end part of the body portion A of the faucet.

The discharge-end part of the inlet-section A of the faucet is constructed to form a flaring upper valve-seat, *c*, and arranged within the upper enlarged portion or chamber of the adjustable nozzle or delivery section B of the faucet is a loose valve-support, *d*, constructed to form a concave seat at its center in reverse relation with the upper flaring valve-seat, *c*. This loose valve-support or lower seat is of perforated or spider-like construction outside of its concave center, and rests at numerous points upon the shoulder formed by the bottom of the enlarged receiving-end portion of the section B, but, as shown in Fig. 3, is of sufficiently-reduced diameter relatively to the interior of said enlarged receiving-end portion or chamber to admit of its free rotation therein.

C is the free ball or globe valve carried by said loose support or revoluble valve-seat *d*. This valve is made of india-rubber, gutta-percha, or other equivalent soft and elastic material; or it might be only covered with such material. It is preferred, however, to use a solid ball of vulcanized rubber or its compounds.

Upon screwing up the section B the flexible and elastic ball C is made to form a close joint with the valve-seat *c* of the section A, and upon partly unscrewing the section B the ball or valve C opens by moving down with said moving section B, and the water or liquid controlled by the faucet escapes through apertures *e* in the lower valve seat or support, *d*, to and through the nozzle. The ball C rests, as it were, in a cage or enlarged valve-chamber, and is free to turn and move about or around, and will be caused to do so by the force of the issuing current, so that it will be repeatedly presenting a new closing-surface, which will add very materially to the durability of the valve. It will always, however, be centered by the cage or support *d* therein or thereof when closing the valve.

The section B may be turned to open and close the faucet by knob-handles *f* on the exterior of said movable section, or it may be turned by any other means.

The valve-seats *c* and *d* form reverse cup-shaped seats for operation in concert when the valve is closed by screwing up the nozzle-section B; but the lower valve seat or support, *d*, being loose and rotatable within the section B, is free to rotate independently of the latter and in common with the ball-valve C when tightly screwing up said valve. This will relieve the soft and flexible material of the valve from rub or wear and friction on its under side, and confine the wear to the upper portion thereof, and this, by suitably shaping the flaring valve-seat *c* to avoid cutting, need not be excessive. Furthermore, by making the lower valve seat or support, d, loose, it may be removed when required when necessary for renewal or to facilitate cleaning, as in the case of plumbers' lead chips getting into the faucet.

Having thus fully described my invention, I claim as new and desire to secure by Letters Patent—

The combination of the outlet or delivery section B, having an internal annular shoulder and the freely-revoluble spider-like valve-support resting thereon, with the inlet-section A, to which the section B is adjustably connected, as described, and the flexible ball C, resting upon said freely-revoluble spider-like support, whereby when the outlet-section is being adjusted toward the inlet-section and the ball brought over the open end of the latter to close it the spider-like support will revolve and wear on the ball be reduced, substantially as set forth.

GEORGE W. ALDRICH.

Witnesses:
A. GREGORY,
C. SEDGWICK.